(12) United States Patent
Eifflaender et al.

(10) Patent No.: US 9,758,004 B2
(45) Date of Patent: Sep. 12, 2017

(54) ARRANGEMENT FOR A VIBRATION DAMPER OF A VEHICLE

(71) Applicant: Bayerische Motoren Werke Aktiengesellschaft, Munich (DE)

(72) Inventors: Thomas Eifflaender, Munich (DE); Hubert Strobl, Koenigsbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 54 days.

(21) Appl. No.: 14/996,722

(22) Filed: Jan. 15, 2016

(65) Prior Publication Data
US 2016/0129746 A1    May 12, 2016

Related U.S. Application Data

(63) Continuation of application No. PCT/EP2014/064990, filed on Jul. 11, 2014.

(30) Foreign Application Priority Data

Aug. 7, 2013 (DE) ........................ 10 2013 215 602

(51) Int. Cl.
*B60G 13/00* (2006.01)
*F16F 9/32* (2006.01)
(Continued)

(52) U.S. Cl.
CPC ........... *B60G 13/001* (2013.01); *B60G 13/08* (2013.01); *B60G 15/063* (2013.01);
(Continued)

(58) Field of Classification Search
CPC ........ B60G 13/06; B60G 13/08; B60G 13/10; B60G 13/001; B60G 15/062;
(Continued)

(56) References Cited

U.S. PATENT DOCUMENTS 1,866,167 A * 7/1932 Lolley ...................... B60G 9/00
188/282.5
3,157,393 A * 11/1964 McIntyre ............. B60G 15/063
267/225
(Continued)

FOREIGN PATENT DOCUMENTS

| DE | 196 28 152 A1 | 1/1998 |
|----|---------------|--------|
| DE | 10 2007 015 590 B3 | 10/2008 |
| GB | 2 309 947 A | 8/1997 |

OTHER PUBLICATIONS

International Search Report (PCT/ISA/210) issued in PCT Application No. PCT/EP2014/064990 dated Dec. 11, 2014 with English translation (six pages).

(Continued)

*Primary Examiner* — Anna Momper
(74) *Attorney, Agent, or Firm* — Crowell & Moring LLP

(57) ABSTRACT

A vibration damper for a vehicle is provided. The vibration damper includes at least one damping cylinder made from a fiber composite material; a guiding element for guiding a piston rod of a piston movably arranged in the damping cylinder. The guiding element is located in a guiding end region at one end of the damping cylinder. A fastening element for use in attaching the at least one damping cylinder to a vehicle is located at a fastening end of the cylinder. At least one of the two end regions of the damping cylinder is conical or wedge-shaped and its element has a corresponding external form that is conical or wedge-shaped. A conical or wedge-shaped clamping sleeve located around the conical or wedge-shaped end regions of the damping cylinder.

8 Claims, 3 Drawing Sheets

(51) Int. Cl.
 *B60G 13/08* (2006.01)
 *B60G 15/06* (2006.01)

(52) U.S. Cl.
 CPC ........ *F16F 9/3242* (2013.01); *B60G 2202/24* (2013.01); *B60G 2204/128* (2013.01); *B60G 2204/1242* (2013.01); *F16F 2224/0241* (2013.01); *F16F 2226/04* (2013.01); *F16F 2234/04* (2013.01)

(58) Field of Classification Search
 CPC .............. B60G 15/063; B60G 2202/24; B60G 2202/242; B60G 2204/1242; F16F 9/3242; F16F 9/3235; F16F 9/54; F16F 13/007
 See application file for complete search history.

(56) References Cited

U.S. PATENT DOCUMENTS

| | | | | |
|---|---|---|---|---|
| 3,409,286 A | * | 11/1968 | Erdmann | B60G 15/062 267/64.17 |
| 3,951,391 A | * | 4/1976 | Papousek | B60G 13/001 267/218 |
| 4,060,155 A | * | 11/1977 | Duckett | B60G 13/08 137/493.1 |
| 4,443,926 A | * | 4/1984 | Pearson | B60G 13/001 188/269 |
| 4,484,670 A | * | 11/1984 | Axthammer | B60G 13/006 188/322.19 |
| 4,635,766 A | * | 1/1987 | Street, Jr. | B60G 13/08 188/284 |
| 6,217,012 B1 | * | 4/2001 | Hashirayama | B60G 15/063 188/322.17 |
| 2007/0093096 A1 | | 4/2007 | Achenbach | |
| 2010/0111596 A1 | | 5/2010 | Handke et al. | |
| 2015/0047934 A1 | * | 2/2015 | Mallin | F16F 9/066 188/269 |

OTHER PUBLICATIONS

German-language Written Opinion (PCT/ISA/237) issued in PCT Application No. PCT/EP2014/064990 dated Dec. 11, 2014 (six pages).

* cited by examiner

ARRANGEMENT FOR A VIBRATION DAMPER OF A VEHICLE

CROSS REFERENCE TO RELATED APPLICATIONS

This application is a continuation of PCT International Application No. PCT/EP2014/064990, filed Jul. 11, 2014, which claims priority under 35 U.S.C. §119 from German Patent Application No. 10 2013 215 602.2, filed Aug. 7, 2013, the entire disclosures of which are herein expressly incorporated by reference.

BACKGROUND AND SUMMARY OF THE INVENTION

The invention relates to an arrangement for a vibration damper of a vehicle, having at least one damping cylinder made from a fiber composite material, a guiding element which is arrangeable in a guiding end region of the damping cylinder, which guiding end region is arranged at one end of the damping cylinder, for guiding a piston rod of a piston arrangeable movably in the damping cylinder, and a fastening element which is arrangeable in a fastening end region of the damping cylinder, which fastening end region is arranged at the other end of the damping cylinder, for fastening the damping cylinder to a further component of the vehicle.

Furthermore, the invention relates to a vibration damper for a vehicle.

Components of vibration dampers are conventionally at least partially formed from a metallic material, such as, for example, steel or aluminum, from plastic or from a fiber composite material. In particular, it is known to produce a damping cylinder, also referred to below as supporting tube, of a vibration damper from a fiber composite material in order to reduce the weight of the supporting tube or of a correspondingly equipped vibration damper. It is also known to produce further components of a vibration damper, such as, for example, a spring plate, from a fiber composite material in order to save weight.

A guiding element is customarily arranged at one end of the supporting tube to linearly guide a piston rod within the supporting tube. On the end of the piston rod is a vibration-damping piston which is guided movably in the supporting tube. A fastening element for fastening the supporting tube to a further component of a vehicle is customarily arranged at the other end of the supporting tube.

The supporting tube can be connected to the guiding element and the fastening element in an integrally bonded manner via an adhesive connection. Such an integrally bonded connection of the supporting tube to the guiding element and to the fastening element is disadvantageously associated with a risk of the formation of gas leakages in the region of the adhesive connections. In addition, a corresponding adhesive connection conceals the risk of a premature and abrupt total failure of the adhesive joint and requires clean surfaces with precise tolerances and which generate additional premachining and/or finishing work in the manufacturing of vibration dampers. Furthermore, during the curing of the adhesive connection, the adhesive customarily shrinks, which may likewise bring about leakages and lead to a poor state of connection.

Alternatively, the supporting tube can be connected to the guiding element and to the fastening element in a form-fitting manner, for example by winding or braiding a "T-porcupine roller" with a fiber composite material, in particular by integrating this connecting technique into the manufacturing process of vibration dampers. A form-fitting T-porcupine-roller connection results in additional component costs for the T-porcupine roller. In addition, the integration of this connecting technique into the manufacturing process of a correspondingly designed vibration damper turns out to be costly and additionally conceals the risk of the connection becoming detached because of different coefficients of thermal expansion of the interconnected components, in particular because of the temperatures prevailing during curing of the fiber composite material.

The connecting techniques mentioned therefore require a complicated manufacturing and preparation of the joining points on the supporting tube and on the guiding element and the fastening element, as a result of which a desired lightweight construction of vibration dampers is restricted.

It is the object of the invention to provide a novel possibility for forming high-quality, lightweight vibration dampers which can be produced cost-effectively.

According to the invention, at least one of the two end regions of the damping cylinder is of conical or wedge-shaped design, and an element arranged in each of the at least one end region has a corresponding conical or wedge shape. At the guiding end region the conical or wedge-shaped design tapers toward that end face of the guiding end region, and at the fastening end region the conical or wedge-shaped design widens toward the end face of the fastening end region.

By means of the conical or wedge-shaped configuration of the at least one end region of the damping cylinder and the corresponding external shape of the element to be connected to said end region, a clamping fit can be produced by means of a frictional connection, which brings about a highly sturdy connection between the supporting tube and the element. By means of forces acting on the connection between the damping cylinder and the element when a the damping cylinder is assembled into a vibration damper, the quality of the connection is increased further by the conical or wedge-shaped configuration of the end region of the damping cylinder and of the external shape of the element.

The shaping of the end region or the external shape of the element can be conical or wedge-shaped. In contrast to a conical configuration, a wedge-shaped configuration has in particular a polygonal area instead of a circular area.

According to an advantageous refinement, the arrangement has at least one clamping sleeve which is arrangeable on the end region in a manner at least partially surrounding the end region and has at least one internal shape of corresponding conical or wedge-shaped design. By arrangement of the clamping sleeve on the end region in a manner at least partially surrounding the end region, the end region is supported from the outside, and therefore the damping cylinder or the end region thereof can be connected to the element by application of relatively large clamping forces, which is equivalent to an increase in the quality of the connection between the end region and the element.

According to a further advantageous refinement, the clamping sleeve is at least partially formed from a metal or a fiber composite material. Aluminum or steel are particularly suitable as the metal. The fiber composite material can be in the form of fiber composite plastic. In a further advantageous embodiment, the fibers of the fiber composite material are arranged running in the circumferential direction of the clamping sleeve to absorb relatively large clamping forces which are produced by the connection between the end region of the damping cylinder and the element. The greater the applied clamping forces the better the quality of the connection and the resistance against leakage.

Furthermore, it is considered advantageous if the fiber composite material contains a thermoplastic or thermosetting plastic.

According to a further advantageous refinement, the clamping sleeve is at least partially adhesively bonded to the end region. This reinforces the connection produced between the end region of the damping cylinder and the element.

In a further advantageous refinement, the clamping sleeve and the end region of the damping cylinder are at least partially connected to each other by a combined, isochronous pressing process with friction welding. This is of advantage in particular if both the clamping sleeve and the damping cylinder are formed with a thermoplastic fiber composite material. The friction welding constitutes a simple and rapid joining method here.

In an advantageous manner, the clamping sleeve which is arrangeable on the guiding end region of conical or wedge-shaped design forms a stop cap. When a vibration damper is completely retracted, the stop cap assists in ensuring that forces introduced into the clamping sleeve by physical contact between the clamping sleeve and a further component of the vibration damper or a further component of a vehicle are introduced into the fiber composite material as compressive forces.

According to a further advantageous refinement, the clamping sleeve which is arrangeable on the guiding end region has an encircling collar forming a spring plate, thereby combining two components of a vibration damper to form a single component which takes on the functions of the two original components.

Furthermore, it is considered advantageous if at least one projection arranged in an at least partially encircling manner is arranged on the inner side of the clamping sleeve in a previous manufacturing process step or retrospectively by a pressing or rolling operation, wherein grooves formed in a substantially complementary manner with respect to the projection are arranged on the outer side of the end region. This produces an additional form-fitting connection between the clamping sleeve and the end region. In the case of a clamping sleeve and an end region made from a thermoplastic fiber composite material, the projection and the groove can be formed in one working step using a hot pressing method, while the clamping sleeve is fixed to the end region.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
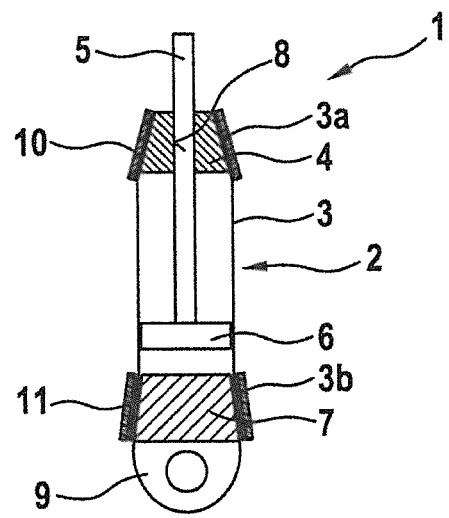
FIG. 1 shows a schematic illustration of an exemplary embodiment of a vibration damper according to the invention.

FIG. 1 shows a schematic illustration of an exemplary embodiment of a vibration damper 1 according to the invention for a vehicle.

The vibration damper 1 has an arrangement 2 which comprises at least one damping cylinder, also called supporting tube 3 below, made from a fiber composite material. A guiding element 4 is arranged in a guiding end region 3a of the supporting tube 3. The guide element 4 guides a piston rod 5 of a piston 6 arranged movably in the supporting tube 3. A fastening element 7 is arranged in a fastening end region 3b of the supporting tube 3 opposite the guiding end region 3a. The fastening element 7 is formed for fastening the supporting tube 3 to a further component (not shown) of the vehicle. The guiding element 4 has a central bore 8 in which the piston rod 5 is guided in a linearly movable manner. The fastening element is provided with a "hinge eye" 9 via which the vibration damper 1 can be connected to the vehicle.

In this embodiment, the two end regions of the supporting tube 3 are of conical design. The elements 4 and 7 arranged in said end regions 3a, 3b also both have a conical external shape. The guiding end region 3a tapers inward from the central region of the supporting tube 3 toward the end face of the guiding end region. The fastening end region 3b widens from the central region of toward the supporting tube 3 towards the end face of the fastening end region.

Figure 3:
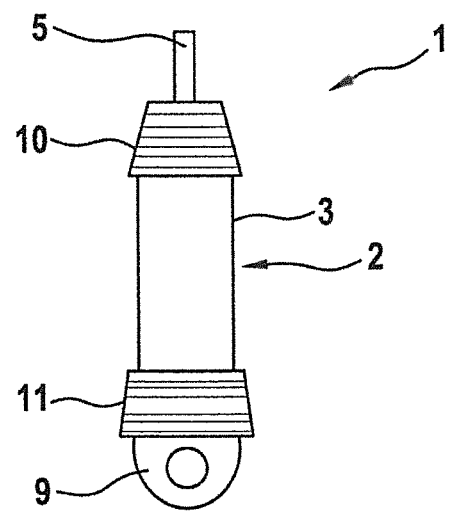
FIG. 3 shows a schematic side view of the exemplary embodiment shown in FIG. 1 or 2 with regard to the orientation of the fibers.

A clamping sleeve 10 is arranged on the guiding end region 3a and a clamping sleeve 11 is arranged on the fastening end region 3b. The clamping sleeves 10 and 11 can be formed from a thermoplastic or thermosetting fiber composite material, wherein the fibers of the fiber composite plastic are arranged running in the circumferential direction of the clamping sleeve 10 or 11 (as shown in FIG. 3). In a thermoplastic embodiment, the clamping sleeves 10 and 11 are connected in an integrally bonded manner by friction welding to the respective end regions 3a, 3b of the supporting tube 3 preferably in the same friction welding operation in which the end elements are bonded with the supporting tube. Alternatively, the clamping sleeves 10 and 11 may be bonded to their respective end regions by an adhesive.

Figure 2:
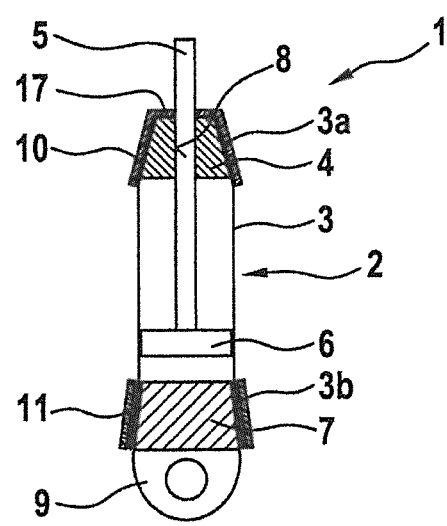
FIG. 2 shows a schematic illustration of a further exemplary embodiment of a vibration damper according to the invention.

FIG. 2 shows a schematic illustration of a further exemplary embodiment of a vibration damper 1 according to the invention. In contrast to the exemplary embodiment shown in FIG. 1, an end section 17 is formed on the clamping sleeve 10, as a result of which the clamping sleeve 10 which is arranged on the guiding end region of conical design forms a stop cap.

FIG. 3 shows a schematic side view of the exemplary embodiments shown in FIGS. 1 and 2, wherein the radial arrangement of the fibers is illustrated.

Figure 4:
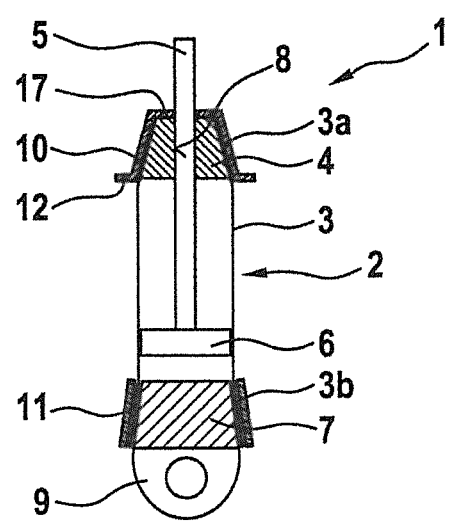
FIG. 4 shows a schematic illustration of a further exemplary embodiment of a vibration damper according to the invention.

FIG. 4 shows a schematic illustration of a further exemplary embodiment of a vibration damper 1 according to the invention. In contrast to the exemplary embodiment shown in FIGS. 1-3, the clamping sleeve 10 which is arranged on the guiding end region 3a has an encircling collar 12 forming a spring plate configured to receive the end of a spring (not shown).

Figure 5:
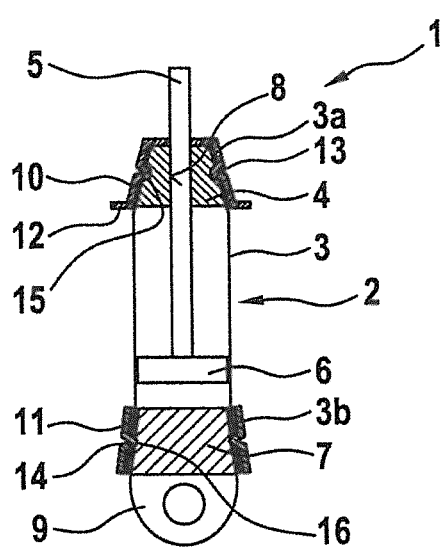
FIG. 5 shows a schematic illustration of a further exemplary embodiment of a vibration damper according to the invention.

FIG. 5 shows a schematic illustration of a further exemplary embodiment of a vibration damper 1 according to the invention. In contrast to the exemplary embodiment shown in FIG. 4, a projection 13 or 14 arranged in an encircling manner is arranged on the inner side of each clamping sleeve 10 or 11, wherein a groove 15 or 16 formed in a substantially complementary manner with respect to the respective projection 13 or 14 is arranged on the outer side of each end region. The projections and corresponding grooves cooperate to further secure the clamping sleeves in position on their respective end regions.

Although the invention is only illustrated schematically, the arrangement according to the invention can, of course, be used both for a single-tube damper and a two-tube damper.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Vibration damper
2 Arrangement
3 Damping cylinder or supporting tube
3a End region
3b End region
4 Guiding element
5 Piston rod
6 Piston
7 Fastening element
8 Bore
9 Hinge eye
10 Clamping sleeve
11 Clamping sleeve
12 Collar
13 Projection
14 Projection
15 Groove
16 Groove
17 End section

What is claimed is:

1. A vibration damper of a vehicle, comprising:
a damping cylinder formed from a fiber composite material;
a guiding element at a guiding end region of the damping cylinder configured to guide a piston rod extending axially therethrough;
a fastening element at a fastening end region of the damping cylinder opposite the guiding end region, the fastening element being configured for fastening the damping cylinder to the vehicle;
a clamping sleeve at each of the guiding end region and the fastening end region,
wherein
the guiding end region of the damping cylinder is tapered inward toward a guiding end region end face away from a central region of the damping cylinder,
the fastening end region of the damping cylinder is tapered outward toward a fastening end region end face away from the central region of the damping cylinder,
guiding and fastening end regions of the damping cylinder are conical or wedge shaped,
the guiding element and the fastening element have a conical or wedge shaped external shape corresponding to the respective guide or fastening end regions, and
the clamping sleeves have a conical or wedge shaped external shape corresponding to and surrounding the respective guide or fastening end regions.

2. The vibration damper as claimed in claim 1, wherein the clamping sleeves are at least partially formed from a metal or a fiber composite material.

3. The vibration damper as claimed in claim 2, wherein fibers of the fiber composite material of the clamping sleeves oriented in a circumferential direction thereof.

4. The vibration damper as claimed in claim 1, wherein the clamping sleeves at are least partially adhesively bonded to the respective guide or fastening end regions.

5. The vibration damper as claimed in claim 1, wherein the clamping sleeves are at least partially connected to the respective guide or fastening end regions by an isochronous pressing process in which the clamping sleeves and the respective guide or fastening end regions and guiding and fastening elements are joined by friction welding.

6. The vibration damper as claimed in claim 1, wherein the clamping sleeve at the guiding end region includes a stop cap portion over at least a portion of the end face of the guiding element.

7. The vibration damper as claimed in claim 6, wherein the clamping sleeve at the guiding end region includes a radially-outward projecting collar configured as a spring plate to receive a spring thereon.

8. The vibration damper as claimed in claim 1, wherein at least one of the clamping sleeves includes a radially-inward projecting projection formed to engage a corresponding groove at a radially-outer surface of the respective guiding or fastening element in a manner that resists axial movement of the sleeve relative the respective guiding or fastening element, and
the radially-inward projecting projection is arranged circumferentially completely around the at least one sleeve or in partially encircling segments.

* * * * *